Feb. 17, 1953 — M. A. CAMPOMAR — 2,628,797
PORTABLE BEACH SHADE SUPPORT
Filed June 15, 1951
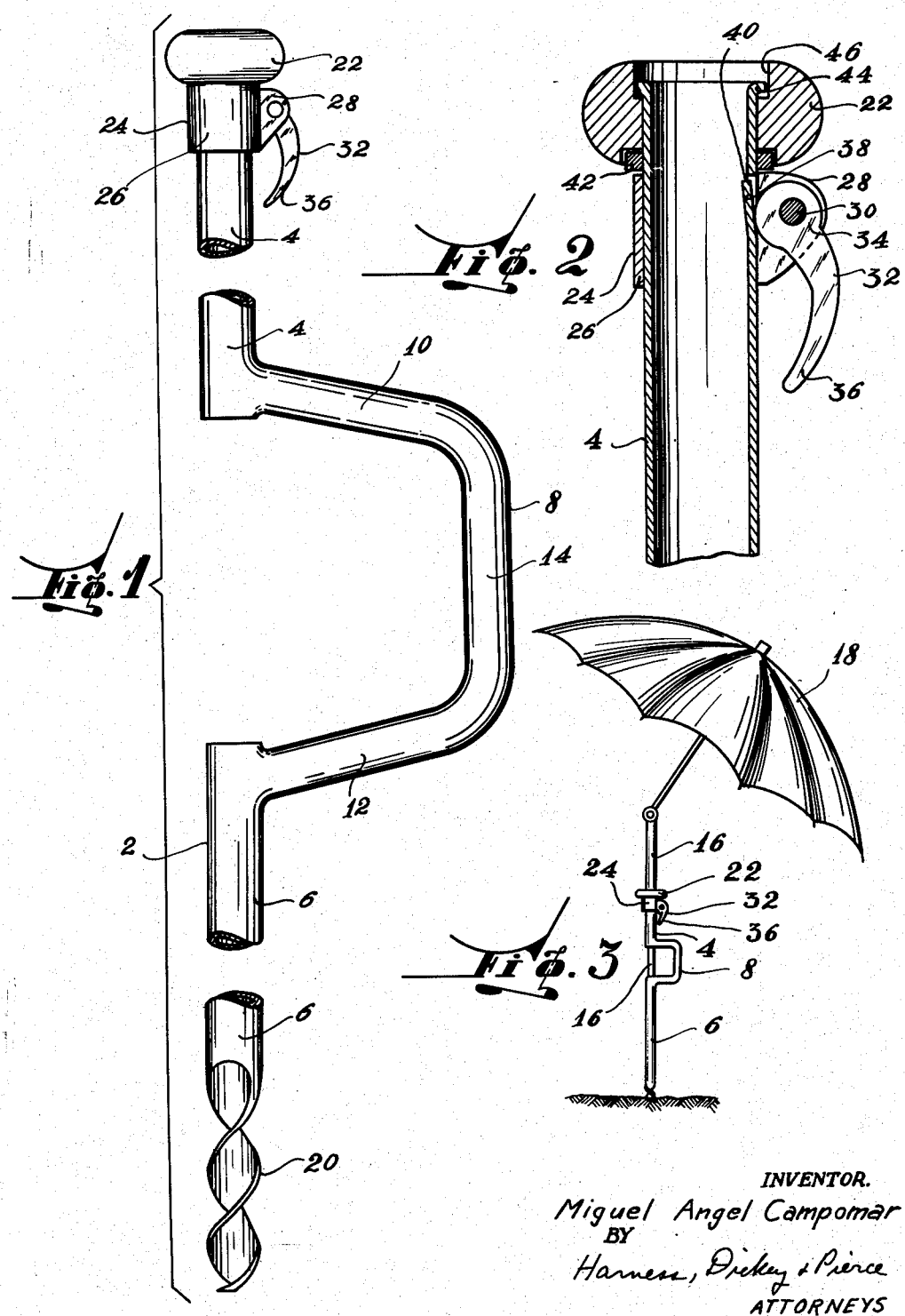
INVENTOR.
Miguel Angel Campomar
BY
Harness, Dickey & Pierce
ATTORNEYS Patented Feb. 17, 1953

2,628,797

UNITED STATES PATENT OFFICE 2,628,797

PORTABLE BEACH SHADE SUPPORT

Miguel A. Campomar, Montevideo, Uruguay

Application June 15, 1951, Serial No. 231,813

2 Claims. (Cl. 248—43)

The present invention relates to a novel support for beach shades and the like.

It is a principal object of the invention to provide a support for beach shades and the like which shall be simple and inexpensive to manufacture, easy to carry and capable of being readily screwed into ground.

Another object of the invention is to provide a support for beach shades and the like, which shall firmly sustain the stem or rod of the shade and shall permit adjustment thereof for height.

When it is desired to instal temporarily a beach shade on the sands, in a garden or park or the like, it is not infrequently found difficult adequately to support the stem or rod of the shade. Such stem is often jointed to allow of positioning the shade at a variable angle, and since gravity and wind pressure are important factors relating to the stability of the shade, the butt end of the stem has heretofore had to be driven deeply into the ground or else fitted into a heavy foot which has made the transporting of the shade a matter of some difficulty.

According to the present invention, these drawbacks are overcome by providing a light tubular support into which the stem of the shade may be inserted and locked in position at any desired height and which may readily be screwed into the ground and unscrewed therefrom to give a firm anchorage without unduly disturbing the surface of the ground or damaging grass plots and the like.

The foregoing and other objects and advantages of the present invention will become more clearly apparent from the following detailed description of a preferred embodiment thereof illustrated by way of example in the accompanying drawings.

In the drawings:

Fig. 1 is a side elevation of my novel beach shade support.

Fig. 2 is a fragmentary view in section showing details of the construction of the head of the support and of the locking means, and Fig. 3 is a diagrammatic view illustrating the support in use.

Referring to the drawings, it will be observed that my novel beach shade support comprises a tubular standard indicated by the general reference numeral 2, and consisting of an upper portion 4 held in coaxial spaced relationship with respect to a lower portion 6 by means of an off set handle portion 8 so that the standard as a whole has the appearance of a crank shaft.

Said handle portion 8 has upper and lower arms 10, 12 and a yoke 14 which may be plain as shown, or, as is known in carpenter's braces, have mounted thereon for free rotation a grip member (not shown) of wood, plastic or other suitable material.

The arms 10, 12 project laterally from the upper and lower portions 4, 6 so as not to obstruct the bores thereof. In this way, the stem 16 (Fig. 3) of a beach shade 18 may not only be inserted into the upper portion 4 of standard 2 but may also be introduced into the lower portion 6, to provide additional lateral stability.

The lower end of the lower portion 6, that is to say the end remote from the upper portion 4, is provided with a screw portion 20 which is preferably of the auger type and is also preferably made separately and permanently joined to the lower portion 6 as by welding.

The upper or free end of the upper portion 4 is provided with an annular knob 22 and a locking means for the stem of the beach shade, which locking means is indicated by the general reference character 24 and comprises a collar 26 having a pair of laterally projecting ears 28 between which is pivoted as at 30, a locking member 32 having a cam head 34 and a free tail 36 by which said cam head may be manually moved about the pivot 30.

Said cam head cooperates with a resilient tongue 38 formed in said upper portion 4 adjacent the upper end thereof but below the knob 22, as by cuts such as that indicated at 40. Said knob 22 is mounted for free rotation on the upper end of the upper portion 4, as by providing an annular head or shoulder 42 secured to said upper portion as by brazing or pinning, and spinning or flaring over the free end of said upper portion 4 as shown at 44, preferably into a recess 46 formed in said button so that the flared portion 44 is sunk below the top surface of the button and out of the way of the hand.

The button serves as a hand hold or pressure head, like the head of a carpenter's brace when screwing the standard into the ground.

This operation is accomplished by resting the end of the screw or bit portion 20 on the ground at the desired location grasping the button 22 with one hand and while exerting pressure on the button lengthwise of the standard, causing the standard to rotate in the appropriate direction to screw the bit into the ground, by grasping the off set portion 8 with the other hand and rotating said off set portion about the main axis of the standard.

When the standard has thus been fixed on the ground the tail 36 of locking member 32 is lifted to free the tongue 38, and the stem or shaft 16 (Fig. 3) of the beach shade 18 is inserted into the bore of the standard, through the annular head 22.

Within the limits of the design of any practical model of my novel support, said stem or haft may be inserted to any desired depth and secured in position by lowering the tail 36 of the locking member 32 to cause the cam head 34 to press tongue 38 inwardly against said stem or shaft. It will be clear to those skilled in the art that in this manner a sturdy, firm, secure and adjustable support is provided for the beach shade and that the whole assembly may be readily dismantled by reversing the operations already explained, whereupon the parts will be in a readily transportable condition.

Although I have described the present invention with particular reference to a preferred embodiment thereof, I do not intend to be limited thereto but may make such changes and modifications therein as lie within the scope of the appended claims.

I claim:

1. A portable beach shade support comprising a standard, including a straight tubular upper portion, having an upper end and a lower end, a straight tubular lower portion in coaxial alinement with said upper portion and having a lower extremity and an upper extremity located in adjacent spaced relationship to said lower end, an off set portion including an upper arm fixed to said upper portion adjacent said lower end, a lower arm fixed to said lower portion adjacent said upper extremity, a yoke joining said arms and forming a handle for rotating said standard about the axis of said upper and lower portions, a boring bit extending from said lower extremity coaxially with said lower portion, an annular head mounted for free rotation and said upper end and extending axially therebeyond to provide a hand pressure surface for applying axial pressure to the standard while rotating same, and locking means at said upper end whereby a stem inserted in said upper portion may be locked in position at any desired point of said stem.

2. A portable beach shade support comprising a standard, including a straight tubular upper portion, having an upper end and a lower end, a straight tubular lower portion in coaxial alinement with said upper portion and having a lower extremity and an upper extremity located in adjacent spaced relationship to said lower end, an off set portion including an upper arm fixed to said upper portion adjacent said lower end, a lower arm fixed to said lower portion adjacent said upper extremity, a yoke joining said arms and forming a handle for rotating said standard about the axis of said upper and lower portions, a boring bit extending from said lower extremity coaxially with said lower portion, an annular head mounted for free rotation on said upper end and extending axially therebeyond to provide a hand pressure surface for applying axial pressure to the standard while rotating same, and locking means at said upper end including a resilient tongue formed in said upper portion adjacent said head, a collar mounted on said upper portion adjacent said head, and a cam lever means pivoted to said collar and located opposite said tongue, whereby a stem inserted on said upper portion may be locked in a desired position by said tongue in response to pressure exerted thereon by said cam lever means.

MIGUEL A. CAMPOMAR.

REFERENCES CITED

The following references are of record in the file of this patent:

UNITED STATES PATENTS

| Number | Name | Date |
|---|---|---|
| 460,005 | Fraser | Sept. 22, 1891 |
| 695,663 | Weirich | Mar. 18, 1902 |
| 2,441,109 | Carlson | May 4, 1948 |
| 2,538,118 | Miller | Jan. 16, 1951 |